United States Patent Office 3,245,906
Patented Apr. 12, 1966

3,245,906
METHOD OF COATING MOLYBDENUM DISULFIDE ON METAL SURFACES AND COMPOSITIONS THEREFOR
Vincent G. FitzSimmons, McLean, Va., assignor to the United States of America as represented by the Secretary of the Navy
No Drawing. Filed Nov. 30, 1962, Ser. No. 241,448
10 Claims. (Cl. 252—25)

The invention described herein may be manufactured and used by or for the Government of the United States of America for governmental purposes without the payment of any royalties thereon or therefor.

This invention relates to a method of adhering molybdenum disulfide to metal surfaces, more particularly to provide a thin lubricating layer of molybdenum disulfide thereon, and to new aqueous compositions therefor.

Molybdenum disulfide is a solid of laminar structure which has been used as a dry lubricant. It is thermally stable at temperatures up to about 550° F., and can function as a solid lubricant at higher temperatures up to about 650° F.

In present commercial practice a thermoplastic or thermosetting resin is used as a binder for adhering molybdenum disulfide powder to steel surfaces in a thin lubricating film. However, these resin binders do not have the necessary thermal stability to allow the use of molybdenum disulfide over the full range of elevated temperatures at which it can function as a solid lubricant. The thermoplastic resin binders soften at relatively low temperatures and the thermosetting resin binders undergo embrittlement on exposure to heat at temperatures above 350° F. for substantial periods of time. In both cases the effectiveness of the resin as a film-former which holds the molybdenum disulfide to the steel surfaces is destroyed and occurs at temperatures which are more than two hundred degrees below the thermal stability limit (550° F.) for molybdenum disulfide and more than three hundred degrees below the upper temperature limit (650° F.) for effective functioning of the molybdenum disulfide as a solid lubricant.

Inorganic binders have also been used commercially for adhering molybdenum disulfide particles to metal surfaces but these encapsulate the molybdenum disulfide particles and involve a wearing away of the inorganic binder from the particles before they can function to lubricate.

The present invention has as an object the provision of a method for adhering a thin layer of molybdenum disulfide to metal surfaces by the use of a binder for the molybdenum disulfide which is stable on exposure to heat at temperatures over the whole elevated temperature range in which molybdenum disulfide is effective as a solid lubricant. It is also an object to provide new aqueous compositions which are useful as the source of the binder to be employed in the aforesaid method.

The above and other objects are accomplished following the present invention by preparing compositions, hereinafter more fully described, which are aqueous ammoniacal thixotropic suspensoids of colloidal boehmite alumina fibrils which contain dispersed fine molybdenum disulfide, coating the metal surface with a thin layer of the composition and dehydrating the thin layer on the metal surface by baking it in air at a temperature in the range of from about 450 to 550° F.

The aqueous ammoniacal thixotropic suspensoids in the compositions of the invention are characterized by random orientation of the colloidal boehmite alumina fibrils in the aqueous medium. By virtue of the random orientation of the alumina fibrils, the structure of the suspensoids is a three-dimensional mesh of the alumina fibrils, bush-like in nature, which mechanically holds the fine particle molybdenum disulfide therein in the dispersed condition. Thus, the new compositions involve two different modes of particle suspension, the one, colloidal, for the boehmite alumina fibrils and the other, mechanical, for the molybdenum disulfide particles.

It is essential to the development and retention of the thixotropic character of the suspensoids of the invention that they contain a proportion of the colloidal boehmite alumina fibrils relative to the fine particle molybdenum disulfide which at a minimum is about 4% by weight based on the weight of the molybdenum disulfide and preferably is from about 14.8 to 16.5% by weight thereon. Optimally, this weight ratio is about 16.5%. The combined total of the colloidal boehmite alumina fibrils and the fine particle molybdenum disulfide in the compositions may vary rather widely and range from about 5 to 60% by weight of the aqueous composition. At combined totals of these solids of from about 6 to 20% by weight of the aqueous compositions, thin layers of about 0.1 to 0.5 mil may be coated on metal surfaces by brush application. The aqueous compositions of higher combined totals of these solids may be diluted to lower concentrations by stirring water thereinto, care being taken, however, not to dilute below the point where the compositions lose their thixotropic character.

The compositions of the invention can be prepared by adding a small amount of water, sufficient to form a wet paste, to a powder of the colloidal boehmite alumina fibrils with which is associated a small amount of acetic acid, sufficient to promote formation of a sol of the fibrils in water, and adding the water-wet paste to a water dispersion of the fine particle molybdenum disulfide and stirring to form a suspension. To this suspension, which is acidic, is added, with stirring, an amount of concentrated ammonium hydroxide sufficient to render the suspension alkaline, whereupon thixotropy is induced therein and the aqueous ammoniacal thixotropic suspensoid formed. Preferably, an excess of the ammonium hydroxide is added to provide reserve alkalinity (ammonia) in the suspensoids which promotes retention of thixotropy which can be lost through reversion of the suspension to an acidic condition. The dispersion of fine particle molybdenum disulfide can be prepared by using a powder of the fine particles of a size on the order of from about 0.2 to 1 micron, adding it to water and stirring. The colloidal boehmite alumina (AlOOH) fibrils may be, for example, of an average fibril length of from about 100 to 400 millimicrons and of an average fibril diameter of from about 4 to 7 millimicrons. Powders of the colloidal boehmite alumina fibrils which contain acetic acid, suitably from about 8 to 11% by weight, can be prepared as described in US Patent 2,915,475 to Bugosh. Powders of this kind are available commercially.

Dehydration of the layer of the aqueous composition coated on the metal surface is conducted by baking it on the metal surface in air for a short period of time at a temperature in the range of from about 450 to 550° F. The baking period will vary somewhat depending upon the thickness of the layer and the baking temperature employed, but generally will be from about 5 to 10 minutes. The dehydration removes both the water of the applied suspensoid and the water bound in the alumina fibrils. The result of this dehydration is a dry coating firmly adhered to the metal surface which contains the molybdenum disulfide particles locked in a matrix of the dehydrated alumina fibrils but not encapsulated by them whereby the molybdenum disulfide as a multiple of small area surfaces is presented by the matrix to the rubbing surface for lubrication. As the coating is worn down by the frictional contact, other particles of the molybdenum disulfide will be uncovered in the matrix to replenish the lubrication. The matrix of the dehydrated alumina fibrils is resistant to property change by heat at temperatures up to 1000° F. and thus provides a binder for molybdenum disulfide which allows it to function as a solid or dry lubricant at elevated temperatures up to about 650° F.

The degree of adhesion of the dehydrated coating will vary with the particular metal of the surface. In general, the adhesion and the cohesion of the dehydrated coating will be the greater, the higher the proportion, within the afore-defined range, of the colloidal boehmite alumina fibrils to the fine particle molybdenum disulfide in the applied aqueous ammoniacal thixotropic suspensoid. The highest adhesion and cohesion of the dehydrated coatings are to be obtained when the thixotropic suspensoids employed for the coating contain the colloidal boehmite alumina fibrils in proportions of from about 14.8 to 16.5% by weight based on the weight of the fine particle molybdenum disulfide herein. Optimum adhesion and cohesion are to be obtained when the aforesaid proportion of the colloidal boehmite alumina fibrils in the aqueous thixotropic suspensoids is about 16.5% by weight. Proportions of the colloidal boehmite alumina fibrils in the aqueous thixotropic suspensoids which are greater than 16.5% by weight will yield less flexible dehydrated coatings until at a value of about 20.6% by weight of the alumina fibrils on the molybdenum disulfide content, the dehydrated coating is so brittle as to break away from the metal surface on flexing. Dehydrated coatings of high adhesion and cohesion which are unaffected in property up to 1000° F. may be obtained, for example, on iron base metal, e.g. cast iron and steel, titanium, rhodium, Monel metal and naval brass surfaces by the method of the invention using an aqueous ammoniacal thixotropic suspensoid in which the proportion of the colloidal boehmite alumina fibrils is at or near 16.5% by weight on the weight of the molybdenum disulfide therein.

The invention is further illustrated by the following example of the preparation of a preferred embodiment of the compositions of the invention.

*Example*

To a dispersion in water of 1.56 grams of powdered molybdenum disulfide (particle size substantially all 0.2 micron) formed by stirring the powder in 20 ml. of water is added with stirring, a water-wet paste of 0.31 gram of Baymal powder containing 82.3% by weight colloidal boehmite alumina fibrils and 10.5% by weight acetic acid and in which the alumina fibrils have an average length of 120 millimicrons and an average diameter of 5 millimicrons. The suspension so formed is acidic and unstable with settling-out of the molybdenum disulfide particles. To this acidic suspension is added, with stirring, 10 ml. of ammonium hydroxide (28%) to form the aqueous ammoniacal thixotropic suspensoid containing the colloidal boehmite alumina fibrils in random orientation in the aqueous medium. The proportion of the colloidal boehmite alumina fibrils in the suspensoid is approximately 16.35% by weight based on the weight of the molybdenum disulfide particles therein.

Thin continuous coatings of an aqueous ammoniacal thixotropic suspensoid prepared as in the above example were brushed on panels of 1020 steel, 52100 steel, titanium, Monel metal, naval brass and rhodium plated-4340 steel. Prior to the coating, the panels, with the exception of the rhodium plated steel panel, were sand-blasted with #80 silica and brushed-clean, and the steel panels were oxidized by heating in air in an oven operating at 600° F. until a light blue coloration was developed. The thickness of the wet coating on the panels was such as to give a dehydrated coating of approximately 0.2 mil thickness. The coatings were dehydrated by baking them on the metal panels for 5 minutes in air in an oven operating at 500° F.

The dehydrated coatings baked on the metal panels were subjected to test for coefficient of friction (kinetic), $mu_k$ in a Bowden-Leben Stick-Slip Apparatus of modified design as described in the Journal of Applied Physics, vol. 24, page 1066 (1953). The tests were conducted at room temperature with applied loads of 1000 and 10,000 grams and with the following results.

| Metal Surface Coated | Coefficient of Friction ($mu_k$) | |
|---|---|---|
| | Load, 1,000 grams | Load, 10,000 grams |
| 1020 Steel | .05 | .05 |
| 52100 Steel | .08 | .05 |
| Titanium | .10 | .06 |
| Monel | .10 | .05 |
| Rodium plated 4340 steel | .06 | .04 |

While in the foregoing description the invention has been described with reference to certain specific embodiments thereof, it obviously may be otherwise practised without departing from the spirit or scope thereof, and, accordingly, it is intended that such embodiments shall be taken by way of illustration and not in limitation except as may be required by the appended claims.

What is claimed is:

1. A composition comprising fine particle molybdenum disulfide in dispersion in an aqueous ammoniacal thixotropic suspensoid of randomly oriented colloidal boehmite alumina fibrils in which said alumina fibrils are present in the proportion of from about 4 to 16.5% by weight based on the weight of said molybdenum disulfide and the combined total of said alumina fibrils and said molybdenum disulfide is from about 5 to 60% by weight of the composition.

2. A composition as defined in claim 1, wherein said alumina fibrils are present in said suspensoid in the proportion of from about 14.8 to 16.5% by weight based on the weight of said molybdenum disulfide.

3. A composition as defined in claim 1, wherein said alumina fibrils are present in said suspensoid in the proportion of about 16.5% by weight based on the weight of said molybdenum disulfide.

4. A method of adhering molybdenum disulfide to a metal surface which comprises coating the metal surface with a thin layer of a composition comprising fine particle molybdenum disulfide in dispersion in an aqueous ammoniacal thixotropic suspensoid of randomly oriented colloidal boehmite alumina fibrils in which said alumina fibrils are present in the proportion of from about 4 to 16.5% by weight based on the weight of said molybdenum disulfide.

and dehydrating said thin layer of the composition on the metal surface by baking it in air at a temperature of from about 450 to 550° F. and the combined total of said alumina fibrils and said molybdenum disulfide is from about 5 to 60% by weight of the composition.

5. A method as defined in claim 4, wherein said alumina fibrils are present in said suspensoid in the proportion of from about 14.8 to 16.5% by weight based on the weight of said molybdenum disulfide.

6. A method as defined in claim 4, wherein said alumina fibrils are present in said suspensoid in the proportion of about 16.5% by weight on the weight of said molybdenum disulfide.

7. A method as defined in claim 4, wherein the metal surface to be coated is an iron base metal surface.

8. A method as defined in claim 5, wherein the metal surface to be coated is a steel surface.

9. A method as defined in claim 6, wherein the metal surface to be coated is a steel surface.

10. A method as defined in claim 5, wherein the metal surface to be coated is titanium.

References Cited by the Examiner
UNITED STATES PATENTS

| | | | |
|---|---|---|---|
| 2,361,211 | 10/1944 | Kalischer | 252—25 |
| 2,619,458 | 11/1952 | McBride | 252—25 |
| 2,622,993 | 12/1952 | McCullough et al. | 252—25 |
| 2,915,475 | 12/1959 | Bugosh | 252—25 |

DANIEL E. WYMAN, *Primary Examiner.*